United States Patent [19]
Wen et al.

[11] Patent Number: 6,046,822
[45] Date of Patent: Apr. 4, 2000

[54] INK JET PRINTING APPARATUS AND METHOD FOR IMPROVED ACCURACY OF INK DROPLET PLACEMENT

[75] Inventors: Xin Wen, Rochester; Douglas W. Couwenhoven, Fairport; Anthony R. Lubinsky, Penfield, all of N.Y.

[73] Assignee: Eastman Kodak Company, Rochester, N.Y.

[21] Appl. No.: 09/004,791

[22] Filed: Jan. 9, 1998

[51] Int. Cl.[7] .................................................. G06F 15/00
[52] U.S. Cl. .............................. 358/1.9; 347/15
[58] Field of Search .................................. 395/101, 103, 395/104, 107, 108, 109, 111, 113; 347/1, 5, 11, 14, 15, 19, 21, 26, 27, 37, 44, 47, 51, 57; 399/4, 24, 32, 33, 50; 358/1.1, 1.3, 1.4, 1.7, 1.8, 1.9, 1.12, 1.14

[56] References Cited

U.S. PATENT DOCUMENTS

| | | | |
|---|---|---|---|
| 4,513,299 | 4/1985 | Lee et al. ................................. | 347/15 |
| 4,679,057 | 7/1987 | Hamada ................................. | 347/252 |
| 4,714,935 | 12/1987 | Yamamoto et al. ..................... | 347/10 |
| 4,748,453 | 5/1988 | Lin et al. ................................ | 347/41 |
| 4,860,034 | 8/1989 | Watanabe et al. ...................... | 347/14 |
| 4,959,659 | 9/1990 | Sasaki et al. ........................... | 347/43 |
| 4,982,199 | 1/1991 | Dunn ..................................... | 347/15 |
| 5,012,257 | 4/1991 | Lowe et al. ............................ | 347/43 |
| 5,036,337 | 7/1991 | Rezanka ................................. | 347/14 |
| 5,168,284 | 12/1992 | Yeung ................................... | 347/17 |
| 5,361,084 | 11/1994 | Paton et al. ........................... | 347/15 |
| 5,473,351 | 12/1995 | Helterline et al. ..................... | 347/19 |
| 5,519,419 | 5/1996 | Stephany et al. ..................... | 347/19 |
| 5,602,572 | 2/1997 | Rylander ............................... | 347/15 |
| 5,610,637 | 3/1997 | Sekiya et al. ......................... | 347/10 |
| 5,621,524 | 4/1997 | Mitani ................................... | 356/338 |
| 5,633,662 | 5/1997 | Allen et al. ........................... | 347/15 |
| 5,646,654 | 7/1997 | Widder ................................. | 347/14 |
| 5,682,185 | 10/1997 | Wade et al. .......................... | 347/19 |
| 5,757,392 | 5/1998 | Zhang ................................... | 347/14 |

OTHER PUBLICATIONS

U.S. application No. 08/899,574, Wen et al., filed Jul. 24, 1997, "Digital Ink Jet Printing Apparatus and Method".

U.S. application No. 08/899,616, Wen, filed Jul. 24, 1997, "Ink jet Printing Apparatus and Method Accomodating Printing Mode Control".

U.S. application No. 08/928,003, Wen, filed Sep. 11, 1997, "Ink Jet Printing Apparatus and Method Using Timing Control of Electronic Waveforms For Variable Gray Scale Printing Without Artifacts".

*Primary Examiner*—Dov Popovici
*Assistant Examiner*—Gabriel I. Garcia
*Attorney, Agent, or Firm*—Walter S. Stevens

[57] ABSTRACT

Ink jet printing apparatus and method for improved accuracy of ink droplet placement on a receiver medium by compensating for jet direction variabilities between ink nozzles. More specifically, the invention is an ink jet printing apparatus and method for printing an output image on a receiver medium in response to an input image file having a plurality of pixels. The apparatus includes a print head and a nozzle integrally attached to the print head. The nozzle has a droplet placement characteristic (e.g., undesired placement of the droplet on the receiver medium) associated therewith. A waveform generator associated with the nozzle generates an electronic waveform including a plurality of electronic pulses to be supplied to the nozzle for adjusting the droplet placement characteristic. In this manner, the invention compensates for the undesired droplet placement characteristic, so that the droplet is accurately placed on the receiver medium irrespective of physical variabilities between nozzles.

32 Claims, 6 Drawing Sheets

FIG. 2

| WAVEFROM SERIAL NUMBER (SNi) | PRINT DENSITY (Di) | TIME DELAY (jth NOZZLE) FORWARD | TIME DELAY (jth NOZZLE) BACKWARD | 1st PULSE | | | 2nd PULSE | | | |
|---|---|---|---|---|---|---|---|---|---|---|
| | | | | $A_1$ | $W_1$ | $S_{1-2}$ | $A_2$ | $W_2$ | $S_{2-3}$ | |
| $SN_1$ | $D_1$ | $T_{F1J}$ | $T_{B1J}$ | 1 | 1 | 1 | 1 | | | |
| $SN_2$ | $D_2$ | $T_{F2J}$ | $T_{B2J}$ | 1 | 1 | 1 | 1 | 0.8 | | |
| $SN_3$ | $D_3$ | $T_{F3J}$ | $T_{B3J}$ | | | | | | | |
| $SN_4$ | $D_4$ | $T_{F4J}$ | $T_{B4J}$ | | | | | | | |
| ... | ... | ... | ... | ... | ... | ... | ... | ... | ... | ... |
| $SN_N$ | $D_{max}$ | $T_{FNJ}$ | $T_{BNJ}$ | | | | | | | |

60

INK JET PRINTING APPARATUS AND METHOD FOR IMPROVED ACCURACY OF INK DROPLET PLACEMENT

FIELD OF THE INVENTION

The present invention generally relates to printing apparatus and methods and more particularly relates to an ink jet printing apparatus and method for improved accuracy of ink droplet placement on a receiver medium by compensating for jet direction variabilities between ink nozzles.

BACKGROUND OF THE INVENTION

An ink jet printer produces images on a receiver medium by ejecting ink droplets onto the receiver medium in an image-wise fashion. The advantages of non-impact, low-noise, low energy use, and low cost operation in addition to the capability of the printer to print on plain paper are largely responsible for the wide acceptance of ink jet printers in the marketplace.

One problem associated with ink jet printing is placement errors of the ink droplets on the receiver medium. Such errors are due to variabilities in the print head manufacturing process in which ink nozzles belonging to the print head are not made identical. The nozzles tend to eject ink droplets in directions different from an ideal direction normal to a nozzle plate in which the nozzles are formed. Such misdirected ink droplet ejection causes misplacement of the ink droplets on the receiver medium. These ink droplet placement errors in turn produce image artifacts (i.e., defects) such as banding, reduced sharpness, extraneous ink spots, ink coalescence and color bleeding.

One method to reduce directional errors in the ejected ink droplets is to minimize the distance between the print head and the receiver medium. Minimizing distance between the print head and receiver medium minimizes error represented by the distance between a correctly placed droplet and a misplaced. This method, however, has its limitations in that if the print head is arranged too close to the receiver medium, there is an increased risk for the ink in the ink nozzles to contact the receiver medium even before ink ejection. When this occurs, the ink spreads-out across the receiver medium in a uncontrolled manner to contaminate the receiver medium.

SUMMARY OF THE INVENTION

The invention resides in an ink jet printing apparatus for printing an output image on a receiver medium in response to an input image file having a plurality of pixels, comprising a print head and a nozzle integrally attached to the print head and having a droplet placement characteristic associated therewith. The nozzle is capable of ejecting an ink droplet therefrom. The apparatus further comprises a waveform generator associated with the nozzle for generating an electronic waveform to be supplied to the nozzle for adjusting the droplet placement characteristic. The waveform is defined by a plurality of electronic pulses. In this manner, the nozzle ejects the ink droplet from the nozzle along a predetermined direction after the waveform supplied to the nozzle adjusts the droplet placement characteristic. Moreover, at least one look-up table is associated with the waveform generator for storing a plurality of waveform serial numbers assigned to respective waveforms, each waveform being defined by at least one predetermined parameter. In addition, a calibrator is associated with the look-up table for calibrating the input image file by converting the pixel values of the input image to waveform index numbers associated with the waveform serial numbers.

An object of the present invention is to provide an ink jet printing apparatus and method for improved accuracy of ink droplet placement on a receiver medium by compensating for jet direction variabilities between ink nozzles.

Another object of the present invention is to provide an ink jet printing apparatus capable of reproducing high-quality digital images of variable tone scales.

A feature of the present invention is the provision of a controller that controls timing of the electronic waveforms ejecting the ink droplets to compensate for physical variabilities between nozzles.

Another feature of the present invention is the provision of a waveform generator associated with the nozzles for generating an electronic waveform supplied to the nozzle. The waveform adjusts the droplet placement characteristic, so that the nozzle ejects the ink droplet along a predetermined direction after adjustment of the droplet placement characteristic.

An advantage of the present invention is that ink droplets are accurately placed on the receiver medium even when manufacturing variabilities exist between nozzles.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following description when taken in conjunction with the accompanying drawings wherein:

FIG. 2 shows an enlargement of an exemplary LUT of FIGS. 1a and 1b;

DETAILED DESCRIPTION OF THE INVENTION

As described in detail hereinbelow, the present invention provides an ink jet printing apparatus and method for improved accuracy of ink droplet placement on a receiver medium by compensating for jet direction variabilities between ink nozzles through use of electronic waveform control.

Figure 1A:
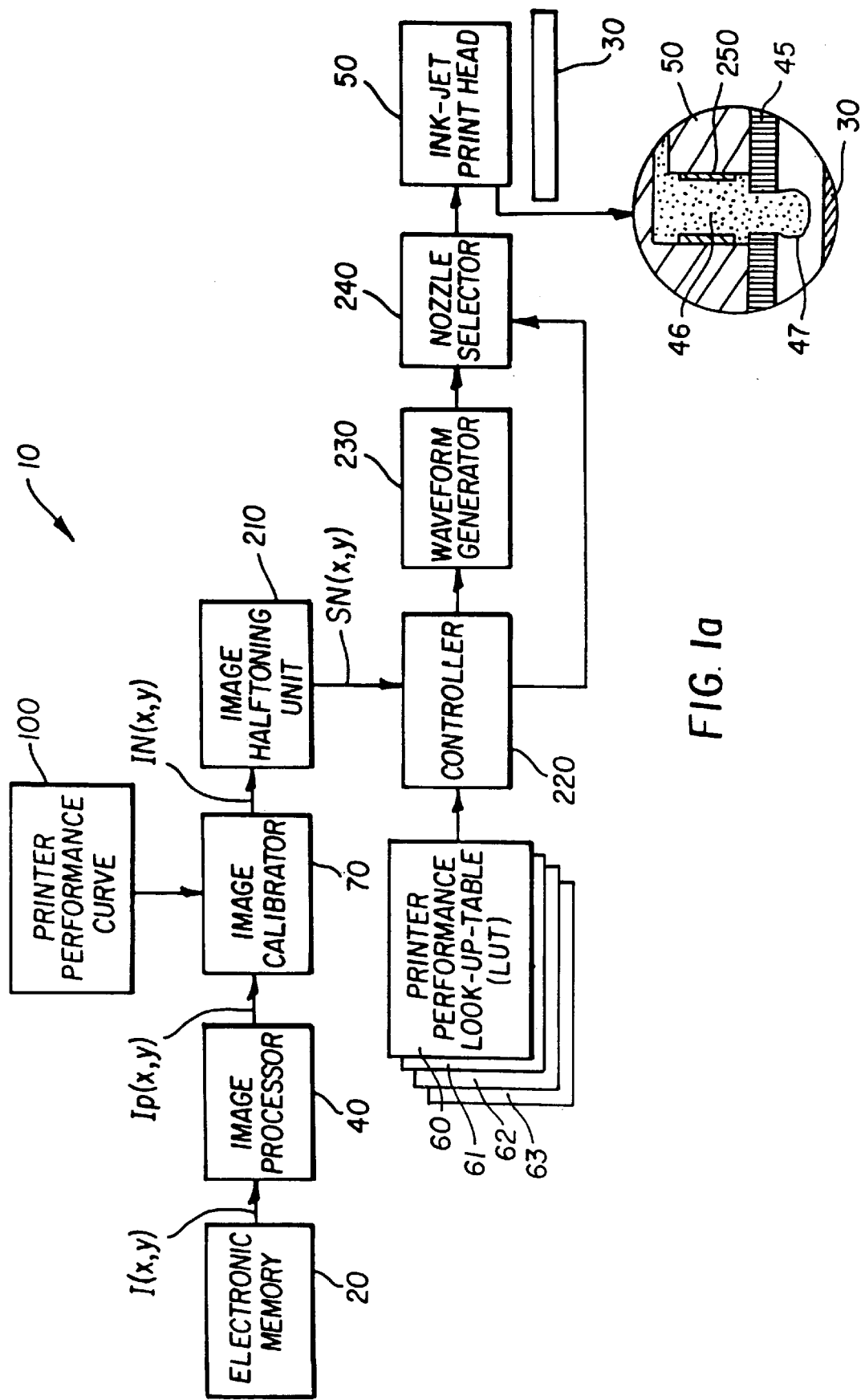
FIG. 1a shows a first embodiment functional block diagram belonging to the present invention, the functional block diagram including a plurality of printer performance LUT's (Look-Up Tables) and a printer performance curve and also including an electromechanical transducer associated with an ink nozzle to eject an ink droplet therefrom.
Figure 1B:
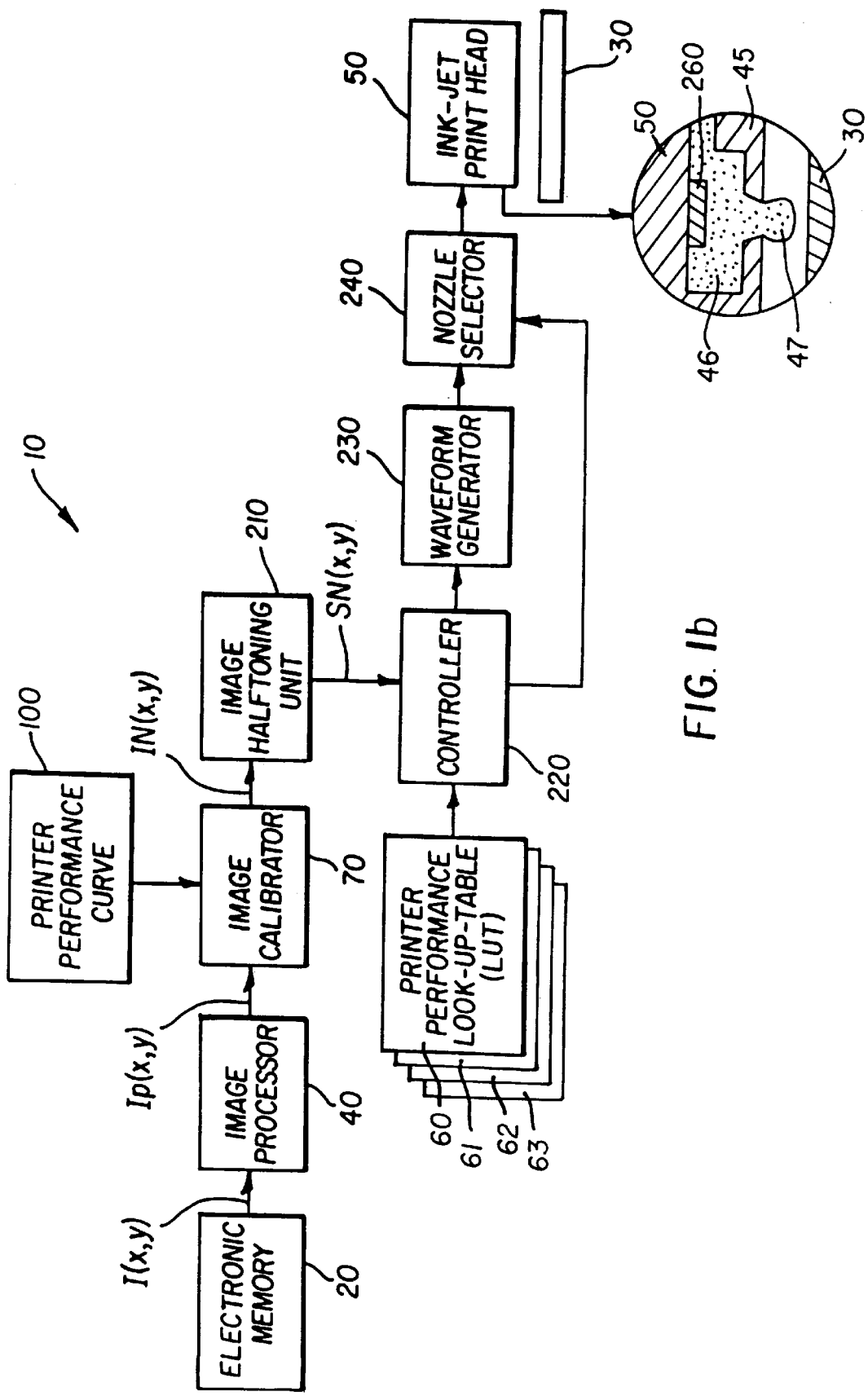
FIG. 1b shows a second embodiment functional block diagram belonging to the present invention, the functional block diagram including the plurality of printer performance LUT's and the printer performance curve and also including a heat generating element associated with the ink nozzle to eject the ink droplet therefrom.

Therefore, referring to FIGS. 1a and 1b, first and second embodiment ink jet printing apparatus, both generally referred to as 10, include an electronic memory 20 having a digital input image file I(x,y) stored therein. With respect to image file I(x,y), the letters "x" and "y" designate column and row numbers, respectively, the combination of which define pixel locations in an input image plane (not shown). More specifically, a plurality of color pixels with a color pixel value at each "x" and "y" location will preferably correspond to pixels having desired color densities (i.e., "aim color densities") when printed on a receiver medium 30. Image file I(x,y) may be generated by a computer or, alternatively, provided as an input generated from a magnetic disk, a compact disk, a memory card, a magnetic tape, a digital camera, a print scanner, a film scanner, or the like. Moreover, image file I(x,y) may be provided in any suitable format well known in the art, such as page-description language or bitmap format.

Still referring to FIGS. 1a and 1b, electrically connected to electronic memory 20 is an image processor 40, which processes image file I(x,y) by performing any one of several desired operations on image file I(x,y). These operations, for example, may be decoding, decompression, rotation, resizing, coordinate transformation, mirror-image transformation, tone scale adjustment, color management, in addition to other desired operations. Image processor 40 in turn generates an output image file $I_p(x,y)$. Output image file $I_p(x,y)$ includes a plurality of pixel values having color code values, the pixel values respectively corresponding to a plurality of ink delivery nozzles 45 (only one of which is shown) integrally connected to an ink jet print head 50. Each nozzle 45 defines an ink chamber 46 therein for ejecting an ink droplet 47 therefrom.

Referring now to FIGS. 1a, 1b, 2, 3 and 4, data related to performance of apparatus 10 have been previously stored in a plurality of printer performance LUT's (Look-Up Tables) such as LUT's 60–63 and also in a printer performance curve 100, as described more fully hereinbelow. Moreover, image file $I_p(x, y)$ is preferably calibrated by means of an image calibrator 70 which converts the color pixel values at each pixel to a plurality of waveform index numbers IN obtained from a continues waveform function constructed in a manner described in detail hereinbelow. LUT's 60–63 provide an electronic waveform, generally referred to as 80, which may comprise a plurality of "square" pulses 90 (only three of which are shown), for driving print head 50. It should be understood that each LUT 60–63 corresponds to a set of respective nozzles 45 (i.e., $j^{th}$ nozzle in FIG. 2) for each given color. It may be appreciated that square pulses 90 are only an example of many possible electronic pulse shapes usable for driving print head 50. Alternative pulse shapes usable with the present invention include, for example, triangular-shaped, trapezoidal-shaped, and sinusoidal-shaped pulses, either in unipolar or bi-polar voltages. In addition, electronic waveform 80 may be fully or partially continuous without one or more of the time delays ($S_{1-2}$, $S_{2-3}$ . . . ). Such alternative waveforms are characterized by predetermined parameters in similar fashion to the example shown for square-shaped pulses 90. For example, a continuous sinusoidal wave may be characterized by the period and the amplitude of each cycle or each half cycle plus a constant voltage offset.

Still referring to FIGS. 1a, 1b, 2, 3 and 4, electronic waveform 80 is characterized by a set of predetermined parameters, which predetermined parameters may be time delays before start of pulses $T_{Fij}$ and $T_{Bij}$ for a waveform serial number $SN_i$ to the jth nozzle, number of pulses, pulse widths (i.e., $W_1$, $W_2$, $W_3$ . . . ), voltage pulse amplitudes (i.e., $A_1$, $A_2$, $A_3$. . . ), and time delays (i.e., $S_{1-2}$, $S_{2-3}$ . . . ) between pulses 90. As described more fully hereinbelow, the delay times before start of pulses $T_{Fij}$ and $T_{Bij}$ not only accounts for the differences between ink droplets of different volumes (i.e., different serial numbers SN's), but also compensates for manufacturing variabilities between ink nozzles (e.g., different nozzle diameters and orientation). Predetermined values of pulse amplitudes, widths and time delays between pulses are selected according to a desired mode of operating print head 50. For example, a desired mode of operation for a piezoelectric ink jet print head 50 may be that frequencies of pulses 90 be reinforced by the resonance frequencies of ink chamber 46, which is associated with ink nozzle 45, so that the amount of energy input to nozzle 45 to cause ink ejection therefrom is minimized. Predetermining the values of the number of pulses, pulse amplitude, pulse width and time delays between pulses results in discrete ink droplet volumes modulatable by electronic waveform 80.

Referring to FIGS. 2, 3, 4 and 5, the placement variabilities between ink nozzles along the print head scan direction are compensated by controlling the time delay before start of pulses $T_{Fij}$ and $T_{Bij}$ (respectively for the forward and backward head scan directions) specifically for the waveform SNi and the jth ink nozzle. In this case i=1, 2, 3 . . . N where "N" is the total number of waveforms 80 and j=1, 2, 3 . . . M where "M" is the total number of nozzles 45 in a print head. The variabilities in ink droplet placement can be caused by the physical variabilities between ink nozzles 45, the differences in the width $W_i$ of pulses 90 belonging to electronic waveform 80, as well as the difference in ejection velocities of droplets 47.

Figure 3:
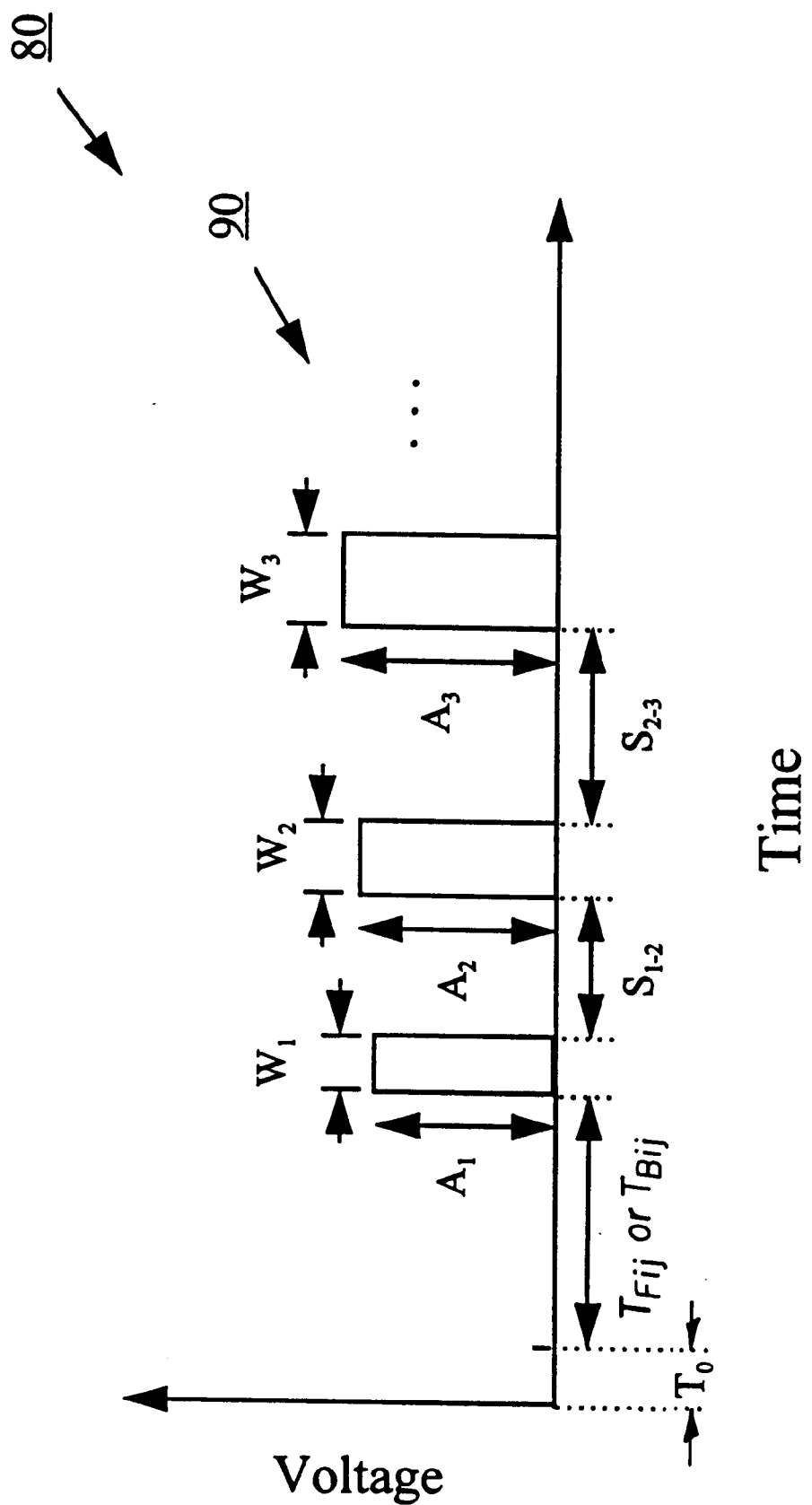
FIG. 3 shows a graph illustrating an electronic waveform comprising a plurality of voltage pulses, the waveform being defined by a plurality of predetermined parameters including time delay before start of pulses, number of pulses, pulse amplitude, pulse width, and time delays between pulses.
Figure 5:
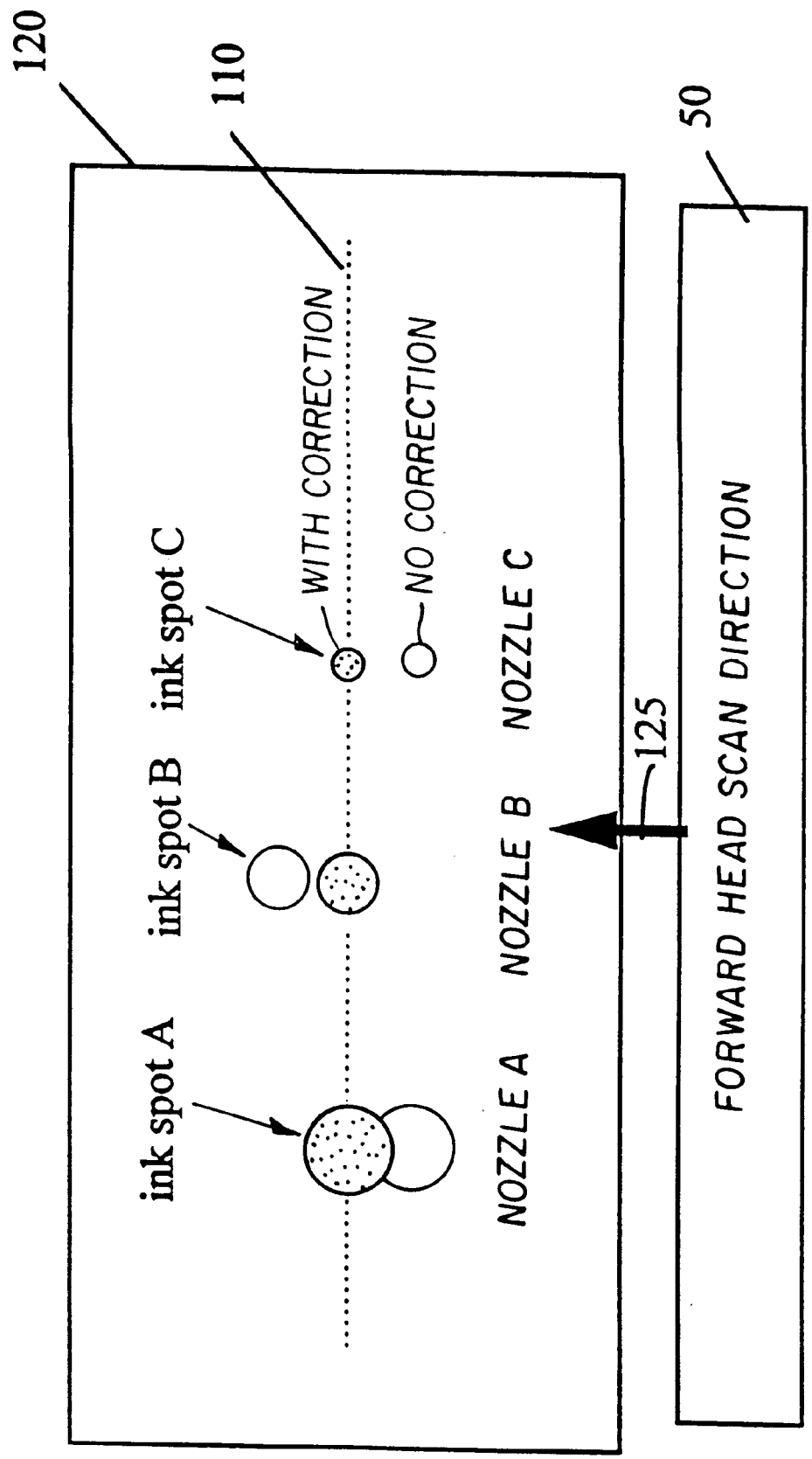
FIG. 5 shows placement of ink droplets of variable diameters or sizes on a receiver medium.

Referring to FIGS. 2, 3, 4 and 5, when the print head scans in the forward direction (indicated by subscript "F"), the time delay before start of pulses $T_{Fij}$ for the jth nozzle actuated by the electronic waveform serial number $SN_i$ of waveform 80 is expressed as follows:

$$T_{Fij}=T_{Fj}-W_i/2-T_{fij} \qquad \text{Equation (1)}$$

in which $T_{Fj}$ (not shown) is the time interval that an ink droplet ejected from the jth ink nozzle takes from the start of the print line $T_0$ (shown FIG. 3) to land on receiver 30. The variabilities in $T_{Fj}$ between nozzles can be experimentally calculated by measuring the displacement variabilities between nozzles (as shown in FIG. 5). $T_{Fij}$ is the time delay before start of pulses for compensating the variabilities between nozzles. $T_{Fij}$ is dependent on the waveform, through $W_i$ and $T_{fij}$, which are defined immediately hereinbelow. $T_{fij}$ is the in-flight time taken by ejected ink droplet 47 to travel from the jth nozzle to receiver 30 for the waveform serial number $SN_i$. $T_{fij}$ is equal to the nozzle-to-receiver distance divided by average ink-droplet velocity in a direction normal to receiver 30. For a fixed nozzle-to-receiver distance, $T_{fij}$ is therefore inversely proportional to the average velocity of the ejected ink droplet. The starting time $T_0$ of each printing line is determined by clock cycles provided by a computer (not shown) or by signals obtained by detecting spaced-apart markings residing on an encoder strip (also not shown). According to the present invention, the previously mentioned "$W_i$" is the total temporal duration of the electronic waveform 80 excluding $T_i$, as discussed more fully hereinbelow. In this regard, for the electronic waveform labeled as SN$_2$ in LUT's 60–63, $$W = W_1 + S_{1\text{-}2} + W_2 \qquad \text{Equation (2)}$$

where, W$_1$ and W$_2$ are the width of the first and second pulses and S$_{1\text{-}2}$ is the time delay between the two pulses, as shown in FIG. 3.

However, W$_i$ and T$_{fij}$, and thus the time delay before start of pulses T$_{Fij}$, are usually different for ink droplet 47 activation associated with different electronic waveform serial numbers SN$_i$. For example, it is possible to design print head 50 such that ink droplets 47 having different volumes are ejected at essentially the same velocity, if desired. In this case, variation between different electronic waveform serial numbers SN$_i$ is W/2. The fraction ½ is included in Equation (1) so that the centers of ink droplets 47 are placed at the center of a pixel on receiver 30 for ink droplets 47 of different volumes. Ink droplets of different volumes are activated by different electronic waveform serial numbers SNi's. In this manner, ink spots A, B and C of different diameters or sizes are symmetrically placed within a pixel on receiver 30.

As best seen in FIG. 5, print head 50 prints line 110 in an image area 120 on receiver 30 by scanning image area 120 in the forward direction indicated by arrow 125. Three pairs of white and gray shaded ink spots A, B, and C are shown placed by Nozzles A, B, and C, respectively, along print line 110 in image area 120. Ideally, ink spots A, B and C are all symmetrically placed on print line 110 as indicated by the gray shaded ink spots.

Still referring to FIG. 5, for ideal ink ejection performance, ink droplets 47 are ejected perpendicular to nozzles 45. T$_{Fj}$ can be set to be a constant T$_F$ that is independent of waveform serial number SN$_i$ of nozzles 45. However, as shown in FIG. 5, physical variabilities in nozzles 45 tend to cause ink droplets 47 to be placed above or below print line 110 as shown by the white ink spots A, B, and C. For purposes of illustration, only placement variabilities in the head-scan direction are shown. The placement errors caused by different physical characteristics of nozzles 45 can be measured by printing a test image comprising spatially separated ink spots on an ink receiver. In this case, placement location of the ink spots by each nozzle 45 can be measured by a microdensitometer. The deviations of the ink spots from the ideal placement locations for each nozzle 45 are then calculated.

Referring again to FIG. 5, in the forward scanning direction, ink droplet landing times T$_{Fj}$ and associated time delays before start of pulses T$_{Fij}$ are then adjusted according to the placement variabilities caused by ink nozzles 45. For example, without compensation, Nozzle A places ink spots upstream to (or before) the ideal printing line 110, as shown by the white ink spot A. The ink droplet landing time T$_{FA}$ and T$_{iA}$ for the Nozzle A is therefore increased by a proper duration, so that ink droplets 47 at Nozzle A are ejected on the ideal printing line 110 as indicated by the shaded ink spot A.

Referring yet again to FIG. 5, when the print head scans in the backward direction (indicated by subscript "B"), opposite to the direction of arrow 125, the timing adjustment for correcting the nozzle variabilities are reversed. For example, in the absence of correction, Nozzle A ejects ink drop after the ideal line location. The ink droplet landing time T$_{BA}$ and T$_{BiA}$ for Nozzle A in the backward head scan direction is decreased by a proper duration for droplets 47 to be ejected by Nozzle A onto the ideal printing line 110. The relationship between the delay times is expressed in equation (3) and shown in FIG. 2.

$$T_{Bij} = T_{Bj} - W_i/2 - T_{fij} \qquad \text{Equation (3)}$$

Returning to FIGS. 2 and 3, LUT's 60–63 include a plurality of optical density values D$_i$ (i=1, . . . , D$_{max}$) for each color corresponding to a plurality of electronic waveforms 80, with each waveform 80 being described by waveform serial numbers SN$_i$ (i=1, . . . , N). "D$_{max}$" is the maximum achievable optical density. As used herein, the terminology "optical density" refers to reflectance or transmittance optical densities as measured by a densitometer (not shown) set in the well-known reflectance "Status A" mode or transmittance "Status M" mode. Such reflectance and transmittance optical densities are measured from reflectance (e.g., coated paper) or transmittance (e.g., transparent film) ink receivers 30. Density D$_i$ itself is measured from a uniform density patch formed on a test image (not shown), which test image is printed by driving nozzles 45 with waveform 80. Waveform 80 is in turn determined by the waveform serial numbers SN$_i$, where i=1, 2, 3, . . . N and where "N" is the total number of electronic waveforms 80 in LUT's 60–63. LUT's 60–63 also include the previously mentioned predetermined parameters, which characterize waveform 80. As previously mentioned, these parameters are time delays before start of pulses T$_{Fij}$ and T$_{Bij}$, the number of pulses, the widths (W$_1$, W$_2$, W$_3$ . . . ), the amplitudes (A$_1$, A$_2$, A$_3$ . . . ), and the time delays between pulses (S$_{1\text{-}2}$, S$_{2\text{-}3}$ . . . ). In LUT's 60–63, optical densities D$_1$, D$_2$, D$_3$ . . . are tabulated as a monotonic function of waveform serial numbers SN$_i$ for a predetermined electronic waveform 80 (e.g., comprising square waves 90). However, it is understood from the teachings herein that a different set of parameters will result in electronic waveforms different from the square waveform 90.

Moreover, still referring to FIGS. 2 and 3, it may be understood that the series of electronic waveform serial numbers SN$_i$ listed in LUT's 60–63 are only a subset of all possible electronic waveforms serial numbers determining the electronic waveform 80 which is used to drive ink jet print head 50. However, it may be appreciated that, when printing with all possible electronic waveforms, many of these electronic waveforms result in equal or similar optical densities D$_i$. Only suitable ones of these waveforms need be selected and listed as the electronic waveforms in LUT's 60–63. Although not required by the present invention, such a selection can be made by minimizing a gap or difference "g" between any two consecutive optical densities D$_i$ and the corresponding two consecutive waveform serial numbers SN$_i$. Minimizing such gaps or differences "g" minimize quantization errors for arriving at suitable waveforms 80.

Figure 4:
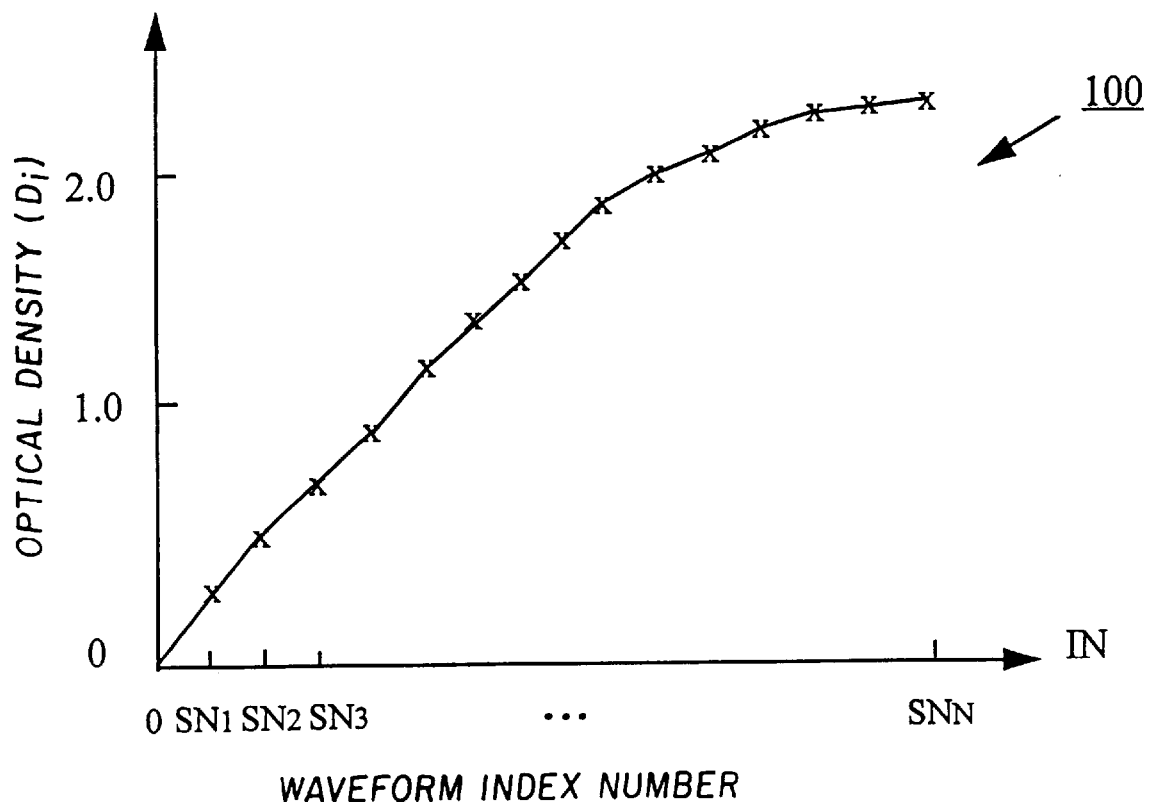
FIG. 4 is a graph illustrating the printer performance curve of FIGS. 1a and 1b.

Referring again to FIG. 4, there is shown printer performance curve 100 formed by plotting optical density D$_i$ as a function of waveform index number IN. To form printer performance curve 100, the N electronic waveforms in LUT's 60–63 are used to print the previously mentioned test image comprising uniform-density patches (not shown) from which optical densities D$_i$ are obtained in a manner well-known in the art. Furthermore, as known in the art, other parameters such as lightness can also be used in place of the optical density for representing the image performance. In the present invention, the optical densities D$_i$ are obtained for each waveform serial number SN$_i$ producing waveform 80. The plurality of "x" symbols shown in FIG. 4 represent data points obtained from LUT's 60–63 corresponding to the SN$_i$'s in LUT's 60–63. Data points "x" are interpolated by techniques well known in the art to produce a continuous curve for expressing IN as a continuous variable. The difference between waveform serial numbers SN$_i$ and waveform index numbers IN is as follows: waveform serial number $SN_i$ describe discrete optical density levels (i.e., tones) that ink jet printer apparatus 10 is capable of producing. With respect to $SN_i$, the total level "N" ranges from 2 to $2^8$ available levels. The plurality of waveform index numbers IN, on the other hand, comprise a continuous variable and thus represent continuous tone. Of course, there should be higher than 8 bit levels ($2^8$), for example, 10–12 bits, used to describe the waveform index numbers IN.

Returning now to FIGS. 1a and 1b, image file $I_p(x,y)$ is calibrated by image calibrator 70. $I_p(x,y)$ includes a multiplicity of color pixel values for each of the plurality of color planes, which color planes may be yellow, magenta and cyan color planes. That is, each color code value is associated with the previously mentioned aim optical density for that color. More specifically, each color pixel value is defined by input image file I(x,y). The calibration performed by image calibrator 70 converts each color pixel value to a waveform index number IN using (a) the aim density at that pixel for that color and (b) printer performance curve 100 (see FIG. 4). As shown in FIGS. 1a and 1b, this calibration process results in an image file IN(x,y) with pixel values described by waveform index numbers IN.

Still referring to FIGS. 1a and 1b, image halftoning unit 210 is used to simulate the continuous-tone perceptual effects using the limited number of density levels (associated with N waveforms) in the ink jet printing apparatus. As used herein, the terminology "image halftoning" refers to the image processing technique which creates the appearance of intermediate tones by the spatial modulation of two tone levels, for example, black and white, or by spatial modulation of multiple tones levels, such as black, white and a plurality of gray levels. Halftoning improves image quality by minimizing image artifacts (i.e., defects) such as contouring which results from printing with a finite number of tone levels. In cases where multiple tone levels are used, image halftoning is often referred to as multiple level halftoning, or multi-level halftoning, or simply multitoning. In the preferred embodiment of the invention, the term image halftoning includes bi-level halftoning, as well.

That is, as shown in FIGS. 1a and 1b, calibrated image file IN(x,y), which is input to image halftoning unit 210, comprises a multiplicity of pixels with each pixel described by waveform index numbers IN for each color. As described hereinabove, the waveform index numbers IN are effectively continuous in nature, which waveform index numbers IN are described in more than 8 bit per pixel per color. The total number of waveform serial numbers, N, corresponding to different optical densities, is in the range $2^1$ to $2^8$, which is much smaller than the total number of waveform index numbers IN. In this manner, the halftoning quantizes optical densities $D_i$. However, simple quantization of optical densities $D_i$, represented by the waveform serial numbers $SN_i$, may nonetheless give rise to visible image artifacts on the printed image. Therefore, in order to solve this problem, image halftoning unit 210 quantifies the calibrated image file IN(x,y) with pixel values described by the continuous waveform index number IN in order to form an image file SN(x,y) with pixel values described by waveform serial numbers $SN_i$. This result is accomplished by spatially modulating adjacent waveform serial numbers $SN_i$ (i.e., image halftoning). The waveform serial numbers $SN_i$'s generated in this manner are stored in LUT's 60–63.

In FIGS. 1a and 1b, halftoned image file SN(x,y) is next sent to a controller 220. Controller 220 performs the function of controlling the corrected waveforms generated for corresponding pixels. Controller 220 accomplishes this function by (a) receiving a waveform serial number $SN_i$ at each pixel location (x, y) for each color of the halftoned image file SN(x,y); (b) looking up the waveform parameters corresponding to the waveform serial number SN at that pixel and color of SN(x,y) using LUT's 60–63; (c) sending the previously mentioned waveform parameters to waveform generator 230; and (d) selecting the correct nozzle 45 corresponding to that color and the pixel by sending signals to a nozzle selector 240 that is connected to waveform generator 230. According to the present invention, the previously mentioned waveform parameters, which are provided by LUT's 60–63, etc., include the time delays before start of pulses $T_{Fij}$'s (and $T_{Bij}$) which compensate for the variabilities between ink nozzles as well as differences between ink droplets 47 of different volumes and velocities.

Referring to FIGS. 1a, 1b and 5, waveform generator 230 generates correct waveforms 80 in response to the waveform parameters, which include time delays before start of pulses $T_{Fij}$ and $T_{Bij}$ controlled by controller 220. Electronic waveforms 80 with preselected time delays are then sent to nozzle selector 240 for actuating an electromechanical transducer 250 or a thermal heat generating element 260 associated with each ink nozzle 45 in print head 50 to eject each droplet 47. In this regard, transducer 250 may be a piezoelectric transducer. Alternatively, each nozzle 45 may include heat generating element 260, rather than transducer 250, which heat generating element 260 is disposed in nozzle 45 for generating thermal energy in response to electronic waveforms 80 in order to eject ink droplets 47 from nozzle 45. In addition, waveform generator 230 may include an electronic circuit (not shown) for producing the correct digital waveforms 80 and may further include a digital-to-analog converter (not shown), and at least one amplifier (also not shown). In the present invention, ink droplets 47 are ejected from different nozzles 45 to arrive at a print line 110 in image area 120 starting at different times as determined by time delays before start of pulses $T_{Fij}$ and $T_{Bij}$ in LUT's 60–63. It may be appreciated that one or more pulses 90 comprising waveform 80 may have a different time duration $W_i$ and/or a different amplitude $A_i$ co-acting to obtain desired in-flight velocities and volumes of droplets 47. Thus, ink droplets 47 having different volumes are accurately placed on receiver 30 to produce ink spots in a symmetric fashion on print line 110. In the manner disclosed hereinabove, image-wise activation and ink ejection of ink droplets 47 reproduce the digital input image I(x, y) on receiver 30 without image artifacts.

It is appreciated from the teachings herein that an advantage of the present invention is that ink droplets are accurately placed on the receiver medium even when manufacturing variabilities exist between nozzles. This is so because the waveform generator associated with the nozzles generates an electronic waveform that compensates for the undesired droplet placement characteristic (i.e., undesired placement of droplets on the receiver medium). Such undesired droplet placement characteristic may be due to physical variabilities between nozzles caused by variabilities in the manufacturing process used to make the print head.

The invention has been described in detail with particular reference to certain preferred embodiments thereof, but it will be understood that variations and modifications can be effected within the spirit and scope of the invention. For example, the present invention is compatible with an ink-jet printer apparatus using inks of different densities for each color. As another example, the present invention may also incorporate other printing modes such as printing a plurality of ink droplets at each image location on a receiver medium in one or more passes. As a further example, more or fewer LUT's than LUT's 60–63 may be used, if required.

Therefore, what is provided is an ink jet printing apparatus and method for improved accuracy of ink droplet placement on a receiver medium by compensating for jet direction variabilities between ink nozzles.

PARTS LIST

10 . . . functional block diagram
20 . . . electronic memory
30 . . . receiver medium
40 . . . image processor
45 . . . nozzle
46 . . . ink chamber
47 . . . ink droplet
50 . . . inkjet print head
60,61,62,63 . . . printer performance look-tables
70 . . . image calibrator
80 . . . waveform
90 . . . group of square pulses
100 . . . printer performance curve
110 . . . printing line
120 . . . image area
125 . . . arrow (forward direction)
210 . . . image halftoning unit
220 . . . controller
230 . . . waveform generator
240 . . . nozzle selector
250 . . . electromechanical transducer
260 . . . heater element

What is claimed is:

1. An ink jet printing apparatus for printing an output image on a receiver medium in response to an input image file having a plurality of pixels, comprising:
   (a) a print head;
   (b) a nozzle integrally attached to said print head and having a droplet placement characteristic associated therewith, said nozzle capable of ejecting an ink droplet therefrom;
   (c) a waveform generator associated with said nozzle for generating an electronic waveform to be supplied to said nozzle for adjusting the droplet placement characteristic, so that said nozzle ejects the ink droplet from said nozzle along a predetermined direction after adjustment of the droplet placement characteristic in response to the waveform supplied thereto, the waveform being defined by a plurality of pulses;
   (d) at least one look-up table associated with said waveform generator for storing a plurality of waveform serial numbers assigned to respective waveforms, each waveform being defined by at least one predetermined parameter; and
   (e) a calibrator associated with said look-up table for calibrating the input image file by converting the pixel values of the input image to waveform index numbers associated with the waveform serial numbers.

2. The apparatus of claim 1, wherein the plurality of waveforms in said look-up table are associated with optical densities produced by said nozzle in response to the waveforms, any two consecutive optical densities defining a gap therebetween of minimized size for reducing quantization errors.

3. The apparatus of claim 1, further comprising an image halftoning unit connected to said calibrator for halftoning the calibrated image file to generate a halftoned image file having a plurality of pixel values defined by the waveform serial numbers.

4. The apparatus of claim 3, further comprising a controller connected to said look-up table for generating waveform parameters received by said waveform generator according to waveform serial numbers provided by said image halftoning unit.

5. The apparatus of claim 1, further comprising a nozzle selector interconnecting said waveform generator and said print head for selecting said nozzle for actuation.

6. The apparatus of claim 1, further comprising an electromechanical transducer disposed in said nozzle and responsive to said waveform for ejecting the ink droplet from said nozzle.

7. The apparatus of claim 6, wherein said electromechanical transducer is formed of a piezoelectric material.

8. The apparatus of claim 1, wherein said look-up table comprises a plurality of predetermined parameters including time delay before start of pulses, number of pulses, pulse amplitude, pulse width and time delay between the pulses for respective waveforms.

9. The apparatus of claim 1, wherein a time delay before start of pulses is a function of nozzles, waveform serial number and direction of movement of said print head.

10. The apparatus of claim 1, further comprising a heat generating element in said nozzle for generating thermal energy responsive to said waveform for ejecting the ink droplets from said nozzle.

11. The apparatus of claim 8, wherein the predetermined parameter of time delay between the pulses is zero.

12. The apparatus of claim 1, wherein the waveform is defined by a plurality of spaced-apart groups of the pulses.

13. An ink jet printing apparatus for continuous tone printing an output image on a receiver medium in response to an input image file having a plurality of pixels, comprising:
   (a) a print head;
   (b) a plurality of nozzles integrally attached to said print head and having a droplet placement characteristic associated therewith, each of said nozzles capable of ejecting an ink droplet therefrom;
   (c) a waveform generator associated with said nozzles for generating an electronic waveform to be supplied to said nozzles, so that said nozzles eject ink droplets from said nozzles along a predetermined direction after adjustment of the droplet placement characteristic in response to the waveform supplied thereto, the waveform defined by a plurality of pulses;
   (d) a plurality of look-up tables associated with said waveform generator for storing a plurality of waveform serial numbers assigned to respective waveforms, each waveform being defined by at least one predetermined parameter;
   (e) a calibrator associated with said look-up tables for calibrating the input image file by converting the pixel values of the input image to waveform index number associated with the waveform serial number;
   (f) an image halftoning unit connected to said calibrator for halftoning the calibrated image file to generate a halftoned image file having a plurality of pixel values defined by the waveform serial numbers;
   (g) a controller connected to said look-up table for generating waveform parameters received by said waveform generator according to waveform serial numbers provided by said image halftoning unit;
   (h) a nozzle selector interconnecting said waveform generator and said print head for selecting predetermined ones of said nozzles for actuation; and
   (i) a piezoelectric electromechanical transducer disposed in at least one of said nozzles and responsive to said waveforms for ejecting the ink droplets from said nozzles.

14. The apparatus of claim 13, wherein said look-up tables comprise a plurality of predetermined parameters including time delay before start of pulses, number of pulses, pulse amplitude, pulse width and time delay between the pulses for respective waveforms.

15. The apparatus of claim 13, wherein a time delay before start of pulses is a function of nozzles, waveform serial number and direction of movement of said printhead.

16. The apparatus of claim 13, wherein the predetermined parameter of time delay between the pulses is zero.

17. The apparatus of claim 13, wherein said waveform generator generates the waveform so as to define a plurality of spaced-apart groups of pulses by controlling number of pulses, pulse width and time delay between the pulses.

18. An ink jet printing method for printing an output image on a receiver medium in response to an input image file having a plurality of pixels, comprising the steps of:
 (a) integrally attaching a nozzle to a print head, the nozzle having a droplet placement characteristic associated therewith, the nozzle capable of ejecting an ink droplet therefrom;
 (b) adjusting the droplet placement characteristic by generating an electronic waveform defined by a plurality of pulses to be supplied to the nozzle, the waveform being generated by a waveform generator associated with the nozzle, so that the nozzle ejects the ink droplet from the nozzle along a predetermined direction after adjustment of the droplet placement characteristic;
 (c) storing in at least one look-up table associated with the waveform generator a plurality of waveform serial numbers assigned to respective waveforms, each waveform being defined by at least one predetermined parameter; and
 (d) calibrating the input image file by converting the pixel values of the input image to waveform index numbers associated with the waveform serial numbers by using a calibrator associated with the look-up table.

19. The method of claim 18, further comprising the step of reducing quantization errors by minimizing a gap defined between any two consecutive optical densities associated with the plurality of waveforms in said look-up table.

20. The method of claim 18, further comprising the step of generating a halftoned image file having a plurality of pixel values defined by the waveform serial numbers by operating an image hafltoning unit connected to the calibrator.

21. The method of claim 18, further comprising the step of generating waveform parameters to be received by the waveform generator according to waveform serial numbers provided by the image halftoning unit by operating a controller connected to the look-up table.

22. The method of claim 18, further comprising the step of selecting the nozzle for actuation by operating a nozzle selector interconnecting the waveform generator and the print head.

23. The method of claim 18, further comprising the step of operating an electromechanical transducer disposed in the nozzle and responsive to the waveform for ejecting the ink droplet from the nozzle.

24. The method of claim 23, wherein the step of operating an electromechanical transducer comprises the step of operating an electromechanical transducer formed of a piezoelectric material.

25. The method of claim 18, wherein said step of storing a plurality of waveform serial numbers in at least one look-up table comprises the step of storing a plurality of predetermined parameters including time delay before start of pulses, number of pulses, pulse amplitude, pulse width and time delay between the pulses for respective waveforms.

26. The method of claim 25, wherein the step of storing a plurality of predetermined parameters comprises the step of storing a value of zero for the predetermined parameter of time delay between pulses.

27. The method of claim 18, further comprising the step of generating thermal energy responsive to the waveform by operating a heat generating element in the nozzle for ejecting the ink droplets from the nozzle.

28. The method of claim 18, wherein the step of adjusting the droplet placement characteristic comprises the step of adjusting the droplet placement characteristic by generating an electronic waveform defined by a plurality of spaced-apart groups of the pulses.

29. An ink jet printing method for continuous tone printing an output image on a receiver medium in response to an input image file having a plurality of pixels, comprising the steps of:
 (a) integrally attaching a plurality of nozzles to a print head, the nozzles having a plurality of droplet placement characteristics respectively associated therewith, each of the nozzles capable of ejecting an ink droplet therefrom;
 (b) adjusting the droplet placement characteristics by generating an electronic waveform defined by a plurality of pulses to be supplied to the nozzles, the waveform being generated by a waveform generator associated with the nozzles, so that the nozzles eject ink droplets from said nozzles along a predetermined direction after adjustment of the droplet placement characteristics;
 (c) storing in each of a plurality of look-up tables associated with said waveform generator a plurality of waveform serial numbers assigned to respective waveforms, each waveform being defined by at least one predetermined parameter;
 (d) calibrating the input image file by converting the pixel values of the input image to waveform index numbers associated with the waveform serial numbers by using a calibrator associated with the look-up tables;
 (e) generating a halftoned image file having a plurality of pixel values defined by the waveform serial numbers by operating an image halftoning unit connected to the calibrator;
 (f) generating waveform parameters to be received by the waveform generator according to waveform serial numbers provided by the image halftoning unit by operating a controller connected to the look-up tables;
 (g) selecting the nozzles for actuation by operating a nozzle selector interconnecting the waveform generator and the print head; and
 (h) operating a piezoelectric electromechanical transducer disposed in each of the nozzles and responsive to the waveforms for ejecting the ink droplets from the nozzles.

30. The method of claim 29, wherein the step of storing a plurality of waveform serial numbers in the look-up tables comprises the step of storing a plurality of predetermined parameters including time delay before start of pulses, number of pulses, pulse amplitude, pulse width and time delay between the pulses for respective waveforms.

31. The method of claim 29, wherein the predetermined parameter of time delay between the pulses is zero.

32. The method of claim 29, wherein the step of adjusting the droplet placement characteristics comprises the step of adjusting the droplet placement characteristics by generating an electronic waveform comprises the step of generating a waveform defined by a plurality of spaced-apart groups of pulses.

* * * * *

UNITED STATES PATENT AND TRADEMARK OFFICE
CERTIFICATE OF CORRECTION

PATENT NO. : 6,046,822
DATED : April 4, 2000
INVENTOR(S) : Xin Wen, et al

Page 1 of 1

It is certified that error appears in the above-identified patent and that said Letters Patent is hereby corrected as shown below:

Title page, insert - This patent is subject to a terminal disclaimer.--

Signed and Sealed this

Nineteenth Day of June, 2001

Attest:

*Attesting Officer*

NICHOLAS P. GODICI
*Acting Director of the United States Patent and Trademark Office*